United States Patent
Yasuda

(10) Patent No.: US 12,536,619 B2
(45) Date of Patent: Jan. 27, 2026

(54) IMAGE ACQUISITION APPARATUS AND IMAGE ACQUISITION METHOD

(71) Applicant: SCREEN Holdings Co., Ltd., Kyoto (JP)

(72) Inventor: Takuya Yasuda, Kyoto (JP)

(73) Assignee: SCREEN HOLDINGS CO., LTD., Kyoto (JP)

( * ) Notice: Subject to any disclaimer, the term of this patent is extended or adjusted under 35 U.S.C. 154(b) by 266 days.

(21) Appl. No.: 18/180,526

(22) Filed: Mar. 8, 2023

(65) Prior Publication Data

US 2023/0342896 A1  Oct. 26, 2023

(30) Foreign Application Priority Data

Apr. 20, 2022 (JP) .................................. 2022-069481

(51) Int. Cl.
| | |
|---|---|
| *G06T 5/50* | (2006.01) |
| *G06T 7/11* | (2017.01) |
| *G06V 10/25* | (2022.01) |
| *G06V 10/74* | (2022.01) |

(52) U.S. Cl.
CPC ................. *G06T 5/50* (2013.01); *G06T 7/11* (2017.01); *G06V 10/25* (2022.01); *G06V 10/761* (2022.01); *G06T 2207/20221* (2013.01)

(58) Field of Classification Search
None
See application file for complete search history.

(56) References Cited

U.S. PATENT DOCUMENTS

| | | | | |
|---|---|---|---|---|
| 8,737,723 | B1* | 5/2014 | Kwatra | G06T 3/4053 |
| | | | | 382/154 |
| 8,818,077 | B2* | 8/2014 | Hwang | G06T 7/593 |
| | | | | 382/154 |
| 2010/0172585 | A1* | 7/2010 | Murashita | H04N 5/265 |
| | | | | 382/168 |

(Continued)

FOREIGN PATENT DOCUMENTS

WO    2019/053839 A1    3/2019

OTHER PUBLICATIONS

Liu et al., "Dark-field Microscopic Image Stitching Method for Surface Defeats Evaluation of Large Fine Optics" (Year: 2013).*

(Continued)

*Primary Examiner* — Hilina K Demeter
(74) *Attorney, Agent, or Firm* — Rimon P.C.

(57) ABSTRACT

In an image acquisition apparatus, acquired are picked-up images 71 representing divided regions, respectively, which are obtained by dividing a predetermined region on a target object, and in the picked-up images 71, each image pair 72 representing adjacent divided regions has an overlapping region 73. The amount of relative positional deviation in each image pair 72 is specified by generating a similarity map 74 indicating a distribution of the degree of similarity. Combination positions of the picked-up images 71 are determined on the basis of the amounts of positional deviation in image pairs 72 included in the picked-up images 71 while it is assumed that an image pair 72 whose similarity map 74 has a directivity is a specific image pair 72 and a weight of the specific image pair 72 is set to be lower than those of other image pairs 72.

5 Claims, 8 Drawing Sheets

(56) References Cited

U.S. PATENT DOCUMENTS

| | | | | |
|---|---|---|---|---|
| 2014/0201126 | A1* | 7/2014 | Zadeh | A61B 5/165 |
| | | | | 706/52 |
| 2016/0048973 | A1* | 2/2016 | Takenaka | H04N 25/41 |
| | | | | 382/199 |
| 2017/0148222 | A1* | 5/2017 | Holzer | H04N 23/698 |
| 2019/0191082 | A1* | 6/2019 | Uehara | H04N 23/687 |
| 2020/0043134 | A1 | 2/2020 | Martin et al. | |
| 2020/0074185 | A1* | 3/2020 | Rhodes | G06N 3/047 |
| 2020/0265568 | A1* | 8/2020 | Kobayashi | H01J 37/28 |
| 2021/0049411 | A1* | 2/2021 | Tanji | G06F 18/41 |
| 2021/0133474 | A1* | 5/2021 | Sawada | G06N 3/045 |
| 2023/0222635 | A1* | 7/2023 | Chee | G06V 10/764 |
| | | | | 382/255 |

OTHER PUBLICATIONS

Dong Liu et al: "Dark-field microscopic image stitching method for surface defects evaluation of large fine optics", Optics Express, vol. 21, No. 5, Mar. 4, 2013 (Mar. 4, 2013), pp. 5974-5987.

Szeliski Richard: "Image Alignment and Stitching: a tutorial", Dec. 10, 2006(Dec. 10, 2006), pp. I-II, available at http://pages.cs.wisc.edu/~dyer/ai-qual//szeliski-tr06.pdf.

Extended European Search Report issued in corresponding European Patent Application No. 23159946.5-1210, dated Jul. 31, 2023.

* cited by examiner

IMAGE ACQUISITION APPARATUS AND IMAGE ACQUISITION METHOD

TECHNICAL FIELD

The present invention relates to an image acquisition apparatus and an image acquisition method.

CROSS REFERENCE TO RELATED APPLICATION

The present application claims the benefit of priority to Japanese Patent Application No. 2022-069481 filed on Apr. 20, 2022, the content of which is incorporated herein by reference in its entirety.

BACKGROUND ART

Conventionally, well known is a method in which image pickup of a target object is performed a plurality of times at different positions and picked-up images which are thus obtained are composited into one image by image processing. In WO 2019/053839 for example, a plurality of picked-up images are obtained, with an overlapping region given in adjacent picked-up images. A corresponding point pair is set in the overlapping region between the adjacent picked-up images, and the amount of relative positional deviation between the picked-up images is calculated on the basis of the corresponding point pair or the like. The relative positional deviation between the picked-up images is corrected on the basis of the calculated amount of positional deviation and the picked-up images are combined, to thereby generate one wide field image.

In a case, for example, where a target object of image acquisition is put in a container, as described above, when a plurality of picked-up images are acquired with an overlapping region provided in the adjacent picked-up images, sometimes an edge of the container is caught (reflected) in the overlapping region. The edge of the container has higher contrast than the target object in many cases, and the amount of positional deviation obtained in such an overlapping region has low reliability, in other words, is abnormal with high possibility. Therefore, when the plurality of picked-up images are combined with all the amounts of positional deviation taken into consideration, an effect of the abnormal amount of positional deviation makes it impossible to combine the plurality of picked-up images with high accuracy.

SUMMARY OF THE INVENTION

It is an object of the present invention to combine a plurality of picked-up images with high accuracy.

The first aspect of the present invention is intended for an image acquisition apparatus for acquiring an image of a target object. The image acquisition apparatus includes a picked-up image acquisition part for acquiring a plurality of picked-up images representing a plurality of divided regions, respectively, which are obtained by dividing a predetermined region on a target object, each image pair in the plurality of picked-up images representing adjacent divided regions and having an overlapping region where images are partially overlapped, a positional deviation amount specifying part for specifying an amount of relative positional deviation in the each image pair by generating a similarity map indicating a distribution of degree of similarity by template matching on the overlapping region of the each image pair, a combination position determination part for determining combination positions of the plurality of picked-up images on the basis of amounts of positional deviation in a plurality of image pairs included in the plurality of picked-up images while assuming that an image pair whose similarity map has a directivity is a specific image pair and setting a weight of the specific image pair to be lower than those of other image pairs, and a combined image generation part for generating a combined image by combining the plurality of picked-up images in accordance with the combination positions.

According to the present invention, it is possible to combine a plurality of picked-up images with high accuracy.

According to the second aspect of the present invention, in the image acquisition apparatus of the first aspect, the positional deviation amount specifying part acquires an evaluation value indicating a strength of directivity of the similarity map of the specific image pair, and the combination position determination part determines the weight of the specific image pair by using the evaluation value.

According to the third aspect of the present invention, in the image acquisition apparatus of the first or second aspect, the positional deviation amount specifying part performs a determination process for determining whether or not there is a directivity of the similarity map of the each image pair.

According to the fourth aspect of the present invention, in the image acquisition apparatus of the third aspect, an expected angle of directivity of the similarity map is set in advance for a predetermined image pair on the basis of regions on the target object, which are represented by the image pair, and the positional deviation amount specifying part performs the determination process for the image pair only on the expected angle and angles in a vicinity of the expected angle.

According to the fifth aspect of the present invention, in the image acquisition apparatus of the third or fourth aspect, a specific image pair candidate is determined in advance on the basis of regions on the target object, among the plurality of image pairs, and the positional deviation amount specifying part performs the determination process only for the specific image pair candidate.

According to the sixth aspect of the present invention, in the image acquisition apparatus of any one of the first to fifth aspects, the positional deviation amount specifying part acquires a map angle indicating a direction of directivity of the similarity map of the specific image pair.

According to the seventh aspect of the present invention, in the image acquisition apparatus of the sixth aspect, an expected angle of directivity of the similarity map is set in advance for a predetermined image pair on the basis of regions on the target object, which are represented by the image pair, and the combination position determination part determines a weight of the image pair on the basis of a difference between the map angle and the expected angle.

The eighth aspect of the present invention is intended for an image acquisition method for acquiring an image of a target object. The image acquisition method includes a) acquiring a plurality of picked-up images representing a plurality of divided regions, respectively, which are obtained by dividing a predetermined region on a target object, each image pair in the plurality of picked-up images representing adjacent divided regions and having an overlapping region where images are partially overlapped, b) specifying an amount of relative positional deviation in the each image pair by generating a similarity map indicating a distribution of degree of similarity by template matching on the overlapping region of the each image pair, c) determining combination positions of the plurality of picked-up images on the basis of amounts of positional deviation in a plurality of image pairs included in the plurality of picked-up images while assuming that an image pair whose similarity map has a directivity is a specific image pair and setting a weight of the specific image pair to be lower than those of other image pairs, and d) generating a combined image by combining the plurality of picked-up images in accordance with the combination positions.

These and other objects, features, aspects and advantages of the present invention will become more apparent from the following detailed description of the present invention when taken in conjunction with the accompanying drawings.

DETAILED DESCRIPTION

Figure 1:
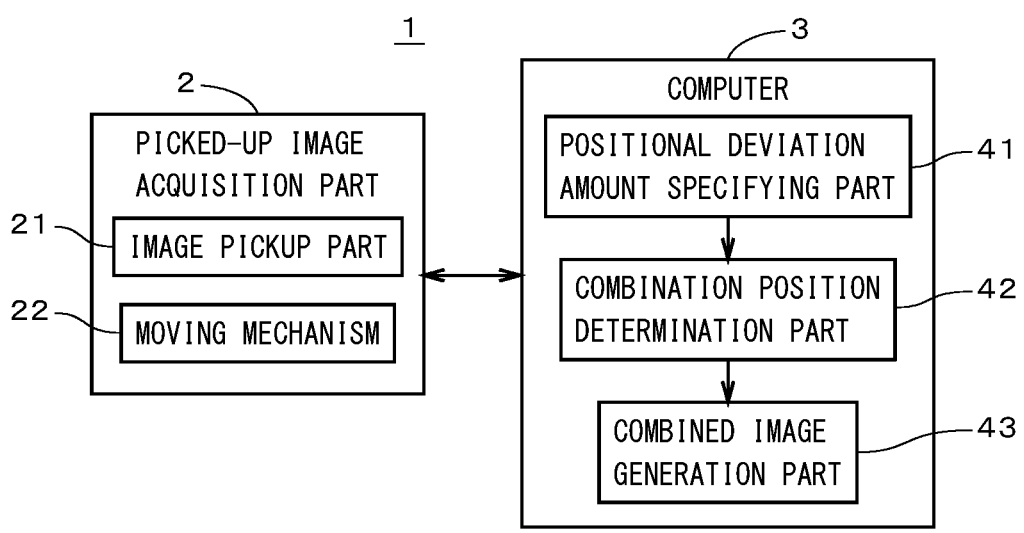
FIG. 1 is a view showing a constitution of an image acquisition apparatus.

FIG. 1 is a view showing a constitution of an image acquisition apparatus 1 in accordance with one preferred embodiment of the present invention. The image acquisition apparatus 1 is an apparatus for acquiring an image of a target object. The target object in the present preferred embodiment is, for example, a cell (cells) inside a container such as a petri dish or the like. The image acquisition apparatus 1 includes a picked-up image acquisition part 2 and a computer 3. FIG. 1 is a block diagram showing functional constituents (a positional deviation amount specifying part 41, a combination position determination part 42, and a combined image generation part 43) implemented by the computer 3.

The picked-up image acquisition part 2 includes an image pickup part 21 and a moving mechanism 22. The image pickup part 21 has an image pickup element or the like and picks up an image of the target object. The moving mechanism 22 has a motor, a ball screw, and the like and moves the image pickup part 21 relative to the target object. An operation of the picked-up image acquisition part 2 for picking up an image of the target object will be described later. An image (hereinafter, referred to as a "picked-up image") picked up by the picked-up image acquisition part 2 is outputted to the computer 3.

Figure 2:
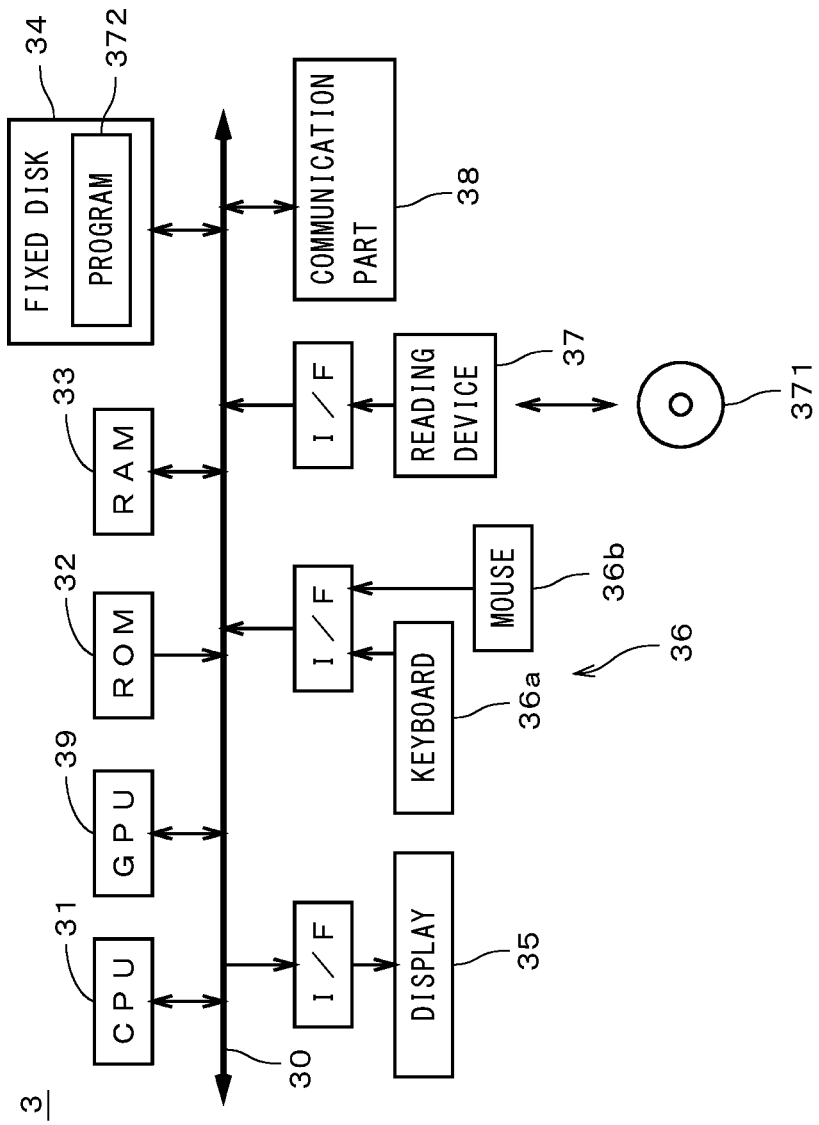
FIG. 2 is a view showing a constitution of a computer.

FIG. 2 is a view showing a constitution of the computer 3. The computer 3 has a constitution of a general computer system including a CPU 31, a ROM 32, a RAM 33, a fixed disk 34, a display 35, an input part 36, a reading device 37, a communication part 38, a GPU 39, and a bus 30. The CPU 31 performs various arithmetic operations. The GPU 39 performs various arithmetic operations on image processing. The ROM 32 stores therein a basic program. The RAM 33 and the fixed disk 34 store therein various information. The display 35 displays thereon various information such as an image or the like. The input part 36 includes a keyboard 36a and a mouse 36b for receiving an input from an operator.

The reading device 37 reads information from a non-transitory computer-readable storage medium 371 such as an optical disk, a magnetic disk, a magneto-optic disk, a memory card, or the like. The communication part 38 transmits and receives a signal with the picked-up image acquisition part 2 and an external device. The bus 30 is a signal circuit for connecting the CPU 31, the GPU 39, the ROM 32, the RAM 33, the fixed disk 34, the display 35, the input part 36, the reading device 37, and the communication part 38 with one another.

In the computer 3, a program 372 is read out from the storage medium 371 through the reading device 37 in advance and stored into the fixed disk 34. The program 372 may be stored into the fixed disk 34 via a network. The CPU 31 and the GPU 39 perform an arithmetic operation while using the RAM 33 and the fixed disk 34 in accordance with the program 372. The CPU 31 and the GPU 39 function as an arithmetic operation part in the computer 3. Any constituent element other than the CPU 31 or the GPU 39, which functions as the arithmetic operation part, may be adopted.

In the image acquisition apparatus 1, the computer 3 performs an arithmetic operation or the like in accordance with the program 372, to thereby implement the functional constituents shown in the block diagram of FIG. 1. In other words, the CPU 31, the GPU 39, the ROM 32, the RAM 33, the fixed disk 34, and peripheral constituents thereof implement the positional deviation amount specifying part 41, the combination position determination part 42, and the combined image generation part 43. All or part of these functions may be implemented by a dedicated electric circuit. Details of the positional deviation amount specifying part 41, the combination position determination part 42, and the combined image generation part 43 will be described later.

Figure 3:
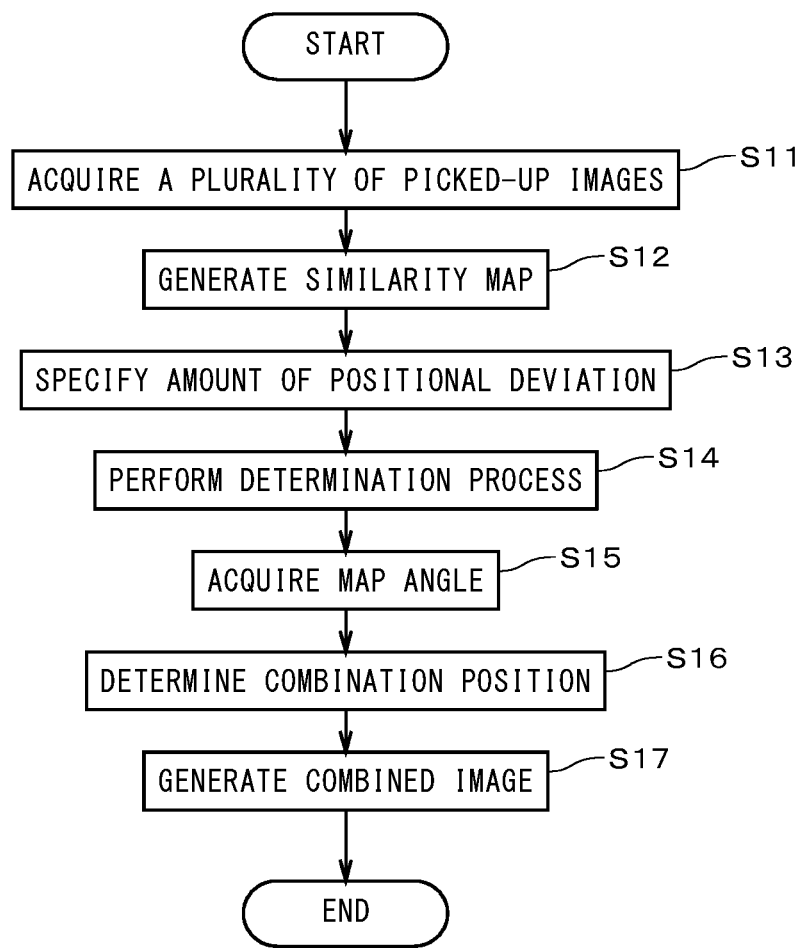
FIG. 3 is a flowchart showing an operation flow for acquiring an image of a target object.

FIG. 3 is a flowchart showing an operation flow of the image acquisition apparatus 1 for acquiring an image of the target object. In the acquisition of the image of the target object performed by the image acquisition apparatus 1, first, the picked-up image acquisition part 2 acquires a plurality of picked-up images (Step S11). In the exemplary case shown in FIG. 4, the target object 9 is cells inside a container 91, and a plurality of divided regions 81 obtained by dividing a predetermined region (herein, an entire region) whose image is to be acquired, on the target object 9, in a plan view are set. The picked-up image acquisition part 2 causes the moving mechanism 22 to dispose the image pickup part 21 sequentially above the plurality of divided regions 81, to thereby acquire the plurality of picked-up images representing the plurality of divided regions 81, respectively. In the present exemplary process, though it is assumed that the picked-up image is a gray scale image, the picked-up image may be a color image.

Figure 4:
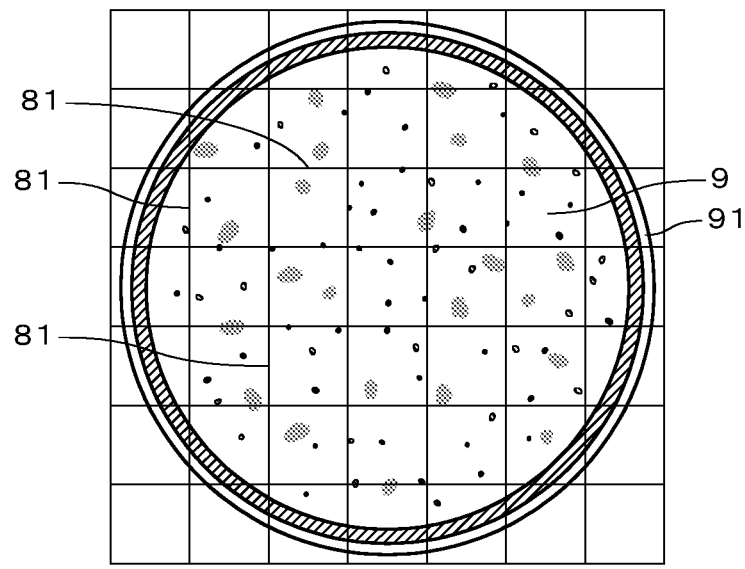
FIG. 4 is a view showing the target object.

At that time, in an up-and-down direction and a left-and-right direction of FIG. 4, assuming that two picked-up images representing two adjacent divided regions 81 are referred to as an "image pair", in each image pair, an overlapping region where images are partially overlapped is provided. In a case, for example, where with respect to one divided region 81 represented by a picked-up image, there are four adjacent divided regions 81 in the up-and-down and left-and-right directions, the picked-up image forms an image pair with each of four picked-up images (hereinafter, each referred to as an "adjacent picked-up image") representing the four divided regions 81. Further, in the picked-up image, provided is an overlapping region where images are partially overlapped, shared with each of the four adjacent picked-up images.

Figure 5:
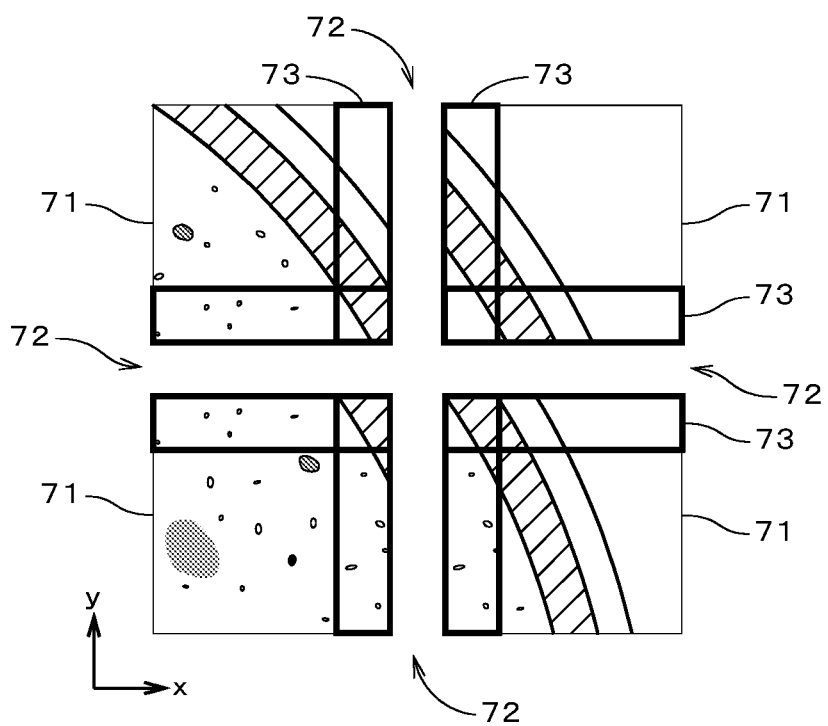
FIG. 5 is a view showing a plurality of picked-up images.

FIG. 5 is a view showing four adjacent picked-up images 71, and arrangement directions (the left-and-right direction and the up-and-down direction) of pixels in each picked-up image 71 are represented as an x direction and a y direction. The upper-left picked-up image 71 in FIG. 5 forms an image pair 72 with the upper-right picked-up image 71 and these picked-up images represent two divided regions 81 which are adjacent to each other in the left-and-right direction. The upper-right picked-up image 71 forms an image pair 72 with the lower-right picked-up image 71 and these picked-up images represent two divided regions 81 which are adjacent to each other in the up-and-down direction. The lower-right picked-up image 71 forms an image pair 72 with the lower-left picked-up image 71 and these picked-up images represent two divided regions 81 which are adjacent to each other in the left-and-right direction. The lower-left picked-up image 71 forms an image pair 72 with the upper-left picked-up image 71 and these picked-up images represent two divided regions 81 which are adjacent to each other in the up-and-down direction. In FIG. 5, the overlapping region 73 of each image pair 72 is surrounded by a thick-line rectangle.

The respective overlapping regions 73 of the image pairs 72 have the same size, and when the picked-up image acquisition part 2 acquires ideal picked-up images 71 (in other words, when the picked-up images 71 are acquired without causing any positional deviation or the like at the image pickup), a region on the target object 9 which is represented by the overlapping region 73 included in one picked-up image 71 coincides with that on the target object 9 which is represented by the overlapping region 73 included in the other picked-up image 71. Actually, with an effect of an error of the amount of movement of the image pickup part 21 caused by the moving mechanism 22, or the like, the respective regions represented by the two overlapping regions 73 of the image pair 72 do not completely coincide with each other.

Figure 6A:
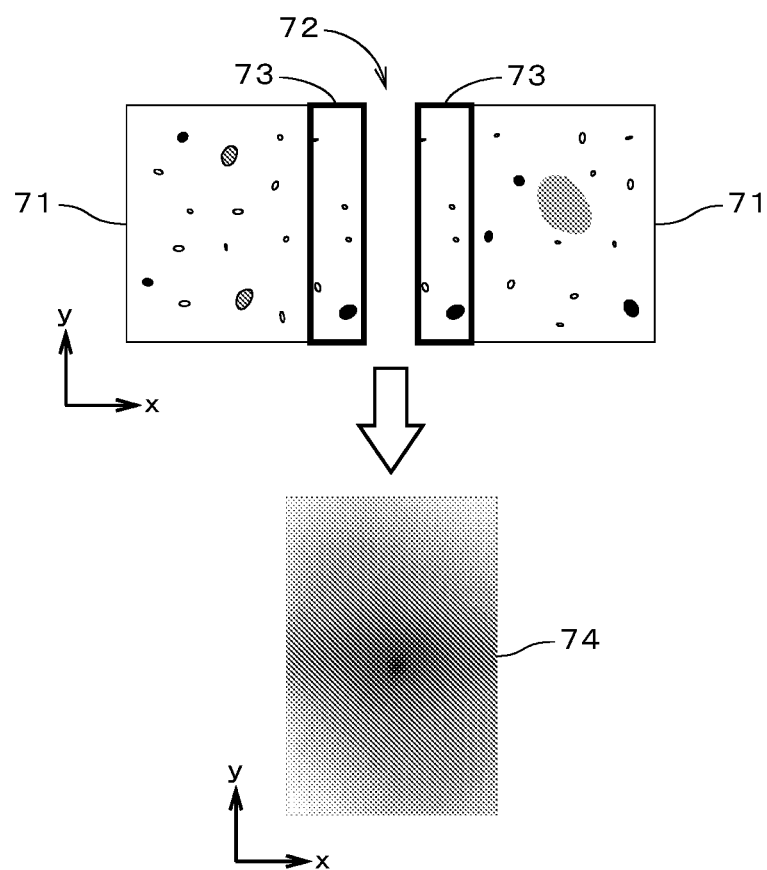
FIGS. 6A and 6B are views each for explaining a similarity map.
Figure 6B:
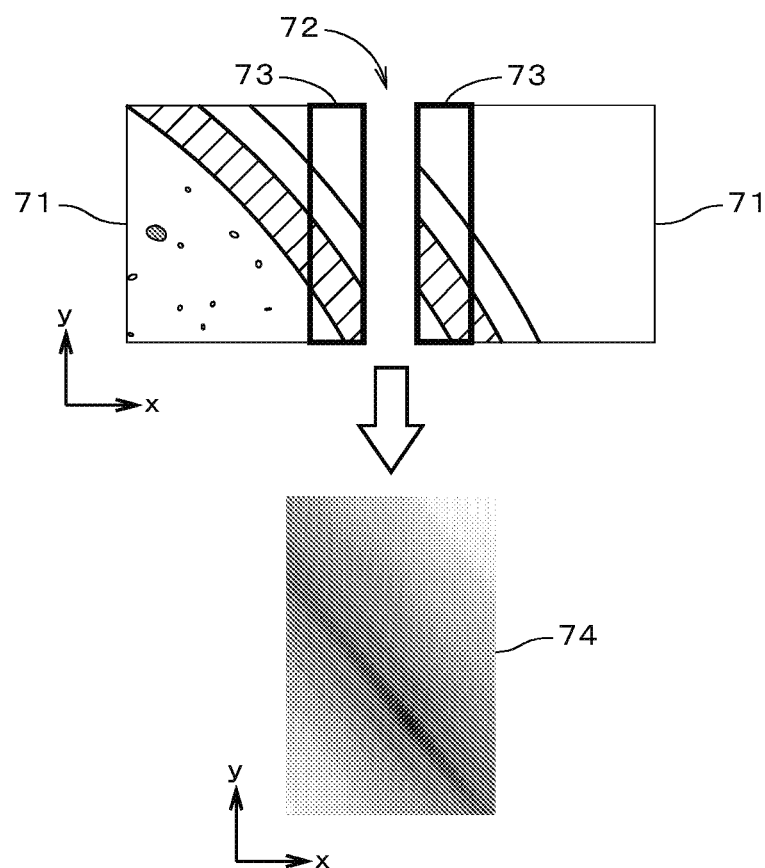

The positional deviation amount specifying part 41 generates a similarity map (also referred to as a score map) by template matching on the overlapping region 73 of each image pair 72 (Step S12). FIGS. 6A and 6B are views each for explaining the similarity map, and the upper stage shows an image pair 72 and the lower stage shows a similarity map 74. Each of the image pairs 72 shown in FIGS. 6A and 6B represents two divided regions 81 which are adjacent to each other in the left-and-right direction.

In the generation of the similarity map 74, for example, an image obtained by deleting an outer edge portion of the overlapping region 73 included in one picked-up image 71 of the image pair 72 (i.e., an image representing a center portion of the overlapping region 73) is extracted and the center of the image is superposed on the center of the overlapping region 73 included in the other picked-up image 71. Then, a sum of squares of differences between values of overlapping pixels is obtained, and a value which becomes larger as the sum of squares becomes smaller (for example, a reciprocal of the sum of squares) is calculated as a degree of similarity. The degree of similarity is a value of an origin point of the similarity map 74. The positional deviation amount specifying part 41 moves the above-described image of one overlapping region 73 relative to the other overlapping region 73 in the x direction and the y direction and obtains the above-described degree of similarity at each position. The multivalued similarity map 74 indicating the degrees of similarity at relative positions of the above-described image relative to the other overlapping region 73 is thereby generated (see the lower stages of FIGS. 6A and 6B). The similarity map 74 indicates a distribution of the degree of similarity of the overlapping region 73 of the image pair 72. In the generation of the similarity map 74, any other value representing the degree of similarity, such as a normalized correlation or the like, may be used. In the similarity map 74 shown in each of the lower stages of FIGS. 6A and 6B, as the degree of similarity becomes higher, the density becomes higher (darker).

After the similarity maps 74 are generated, the amount of relative positional deviation in each image pair 72 is specified (Step S13). The amount of positional deviation is indicated by, for example, a vector from the origin point in the similarity map 74 to a position where the degree of similarity becomes maximum therein. The amount of positional deviation may be obtained from an image obtained by applying a smoothing filter or the like to the similarity map 74.

Herein, the image pair 72 shown in FIG. 6A is compared with the image pair 72 shown in FIG. 6B. In the image pair 72 of FIG. 6A, since the overlapping region 73 represents only the target object 9, a point-like region having high degree of similarity appears in the similarity map 74 on the basis of the characteristic feature of the target object 9 itself. On the other hand, in the image pair 72 of FIG. 6B, the overlapping region 73 represents not only the target object 9 but also part of an edge of the container 91. In the edge of the container 91, since the contrast is higher than that on the target object 9, a region having high degree of similarity becomes likely to appear in a strip-like manner, extending in a direction of the edge of the container 91 in the similarity map 74. Thus, in a case where the region having high degree of similarity exists extending in a specific direction, the position at which the degree of similarity becomes maximum becomes likely to be included in the region, and the amount of positional deviation which is abnormal with high possibility, i.e., the amount of positional deviation having low reliability is disadvantageously acquired. Then, in the following process performed by the image acquisition apparatus 1, it is possible to suppress an effect of the amount of positional deviation having low reliability.

Figure 7:
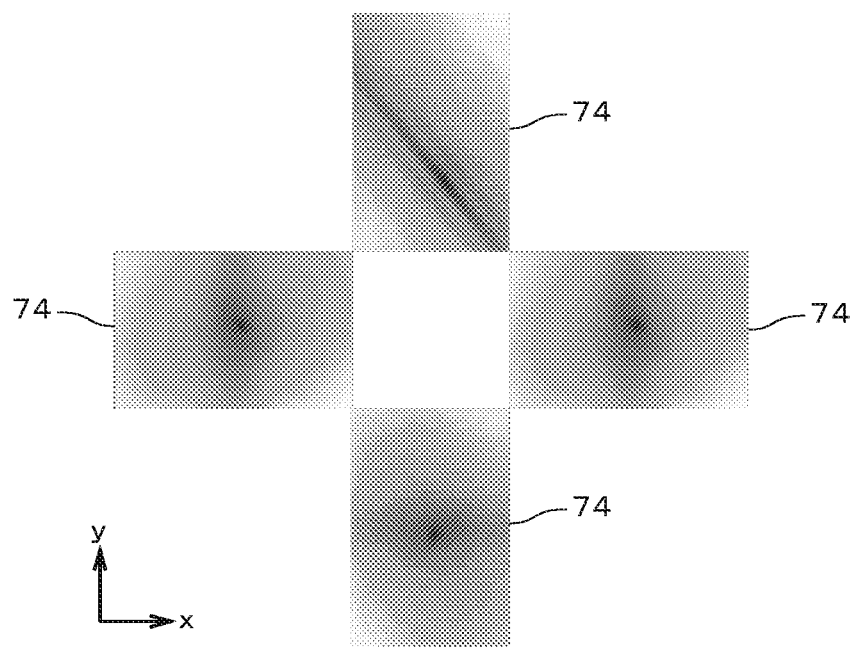
FIG. 7 is a view showing a plurality of similarity maps.
Figure 8:
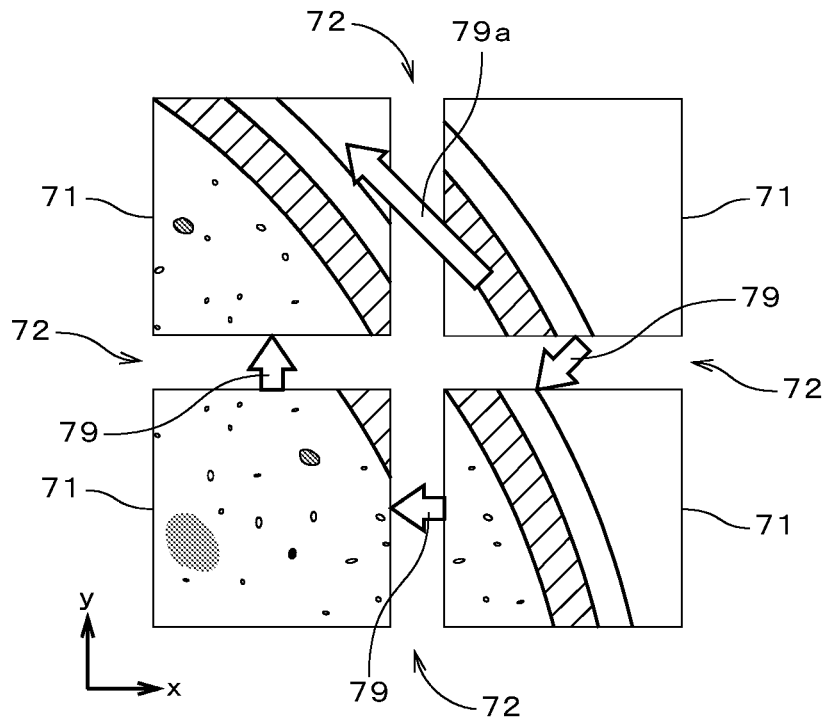
FIG. 8 is a view showing the amounts of positional deviation specified from a plurality of image pairs.

FIG. 7 is a view showing four similarity maps 74 generated from the four image pairs 72 shown in FIG. 5, and positions of the four similarity maps 74 correspond to the positions of the four image pairs 72, respectively. FIG. 8 is a view showing the amounts of positional deviation specified from the four image pairs 72, and the amount of relative positional deviation in each image pair 72 is indicated by an arrow 79 (reference sign 79a is given to one arrow) disposed between two picked-up images 71 constituting the image pair 72. The amount of positional deviation (see the arrow 79a) in the image pair 72 of the upper-left and upper-right picked-up images 71 in FIG. 8 is abnormal with the effect of the edge of the container 91.

After the amounts of positional deviation are specified, the positional deviation amount specifying part 41 performs a determination process for determining whether or not there is a directivity of the similarity map 74 of each image pair 72 (Step S14). In an exemplary determination process, a binary image is generated by binarizing the similarity map 74 and a region having high degree of similarity (hereinafter, referred to as a "specified region") is thereby specified. Subsequently, ellipse approximation of the specified region is performed in the binary image, and when the ratio of the lengths of a major axis (long axis) and a minor axis (short axis) of the approximated ellipse (the major axis length/the minor axis length) is not smaller than a predetermined value, it is determined that there is a directivity of the similarity map 74. On the other hand, when the length ratio is smaller than the predetermined value, it is determined that there is no directivity of the similarity map 74. There may be a case where the area of the specified region is calculated before performing the ellipse approximation of the specified region and when the area is smaller than a predetermined area, it is determined that there is no directivity of the similarity map 74. A binarization threshold value of the similarity map 74 may be determined by a well-known method or may be a fixed value. In the following description, an image pair 72 whose similarity map 74 is determined to have a directivity is referred to as a "specific image pair 72".

After that, a map angle indicating a direction of the directivity of the similarity map 74 of the specific image pair 72 is acquired (Step S15). The map angle can be acquired, for example, by performing Hough transform on the binary image of the similarity map 74. The map angle may be obtained by any other well-known method, such as by obtaining a principal axis of inertia in the binary image, performing ellipse approximation, or the like.

The above-described determination process and the acquisition of the map angle (Steps S14 and S15) can be performed in the multivalued similarity map 74. For example, by performing two-dimensional Gaussian fitting (Gaussian fitting at each angle) in the similarity map 74, it is checked whether or not there is a deviation of the angle (i.e., angular dependence) in a spread of the distribution (standard deviation). Whether or not there is a deviation can be determined, for example, by the ratio of the maximum value and the minimum value of the standard deviation in a plurality of angles (the maximum value/the minimum value). When the ratio is not smaller than a predetermined value, it is determined that there is a directivity of the similarity map 74, and the angle whose standard deviation is maximum is acquired as the map angle.

As described above, in the positional deviation amount specifying part 41, when a region having high degree of similarity in the similarity map 74 has a directivity (in other words, the similarity map 74 has a directivity), the image pair 72 of the similarity map 74 is determined as the specific image pair 72 and the map angle is acquired. In the exemplary case shown in FIG. 7, the upper-side similarity map 74 has a directivity, and the image pair 72 of the upper-left and upper-right picked-up images 71 shown in FIG. 8, corresponding to the similarity map 74, is specified as the specific image pair 72. Further, the map angle may be acquired only as necessary.

In the combination position determination part 42, combination positions which are final positions of the plurality of picked-up images 71 are determined on the basis of the amounts of positional deviation of the plurality of image pairs 72 include in the plurality of picked-up images 71 (Step S16). Herein, as described earlier, each picked-up image 71 forms an image pair 72 with each of the picked-up images 71 (i.e., the adjacent picked-up images 71) of all the divided regions 81 adjacent to the divided region 81 of the picked-up image 71. Further, each adjacent picked-up image 71 forms an image pair 72 also with each of other picked-up images 71. Therefore, on the combination position of each picked-up image 71, produced is an effect of not only the amounts of positional deviation in the plurality of image pairs 72 constituted of the picked-up images 71 but also the amounts of positional deviation in the other image pairs 72.

In the combination position determination part 42, a difference between the amount of final positional deviation of each image pair 72 and the amount of positional deviation of the image pair 72 which is specified in above-described Step S13 (hereinafter, referred to as the amount of original positional deviation) is handled as an error, the amount of final positional deviation of the image pair 72 being the amount of final positional deviation between each picked-up image 71 disposed at the combination position and each of the adjacent picked-up images 71 disposed at the combination positions. Then, the combination positions are determined so that the sum of squares of the errors of the plurality of (all the) image pairs 72 except the specific image pair(s) 72 should be minimum in each of the x direction and the y direction.

As described above, in the present exemplary process, after excluding the specific image pair(s) 72, the combination positions of the plurality of picked-up images 71 are determined by the least-squares method. In the determination of the combination positions, the amount of original positional deviation of the specific image pair(s) 72 is changed to 0, and the combination positions may be determined so that the sum of squares of the errors of the plurality of (all the) image pairs 72 including the specific image pair(s) 72 should be minimum. Further, to the error of the specific image pair(s) 72, given is a predetermined weight smaller than that of the error of any other image pair 72 (the image pairs 72 other than the specific image pair(s) 72), and the combination positions may be determined by the weighted least-squares method. In the determination of the combination positions, both in the cases where the specific image pair(s) 72 is excluded and where the amount of original positional deviation of the specific image pair(s) 72 is changed to 0, substantially, it can be said that the combination positions of the plurality of picked-up images 71 are determined by setting the weight of the specific image pair(s) 72 (the weight of the amount of original positional deviation) to be lower than that of any other image pair 72 so that an effect of the specific image pair(s) 72 becomes smaller in the determination of the combination positions. In the determination of the combination positions, an error backpropagation method or the like, other than the least-squares method, may be used, and various methods for minimizing the error can be used.

Figure 9:
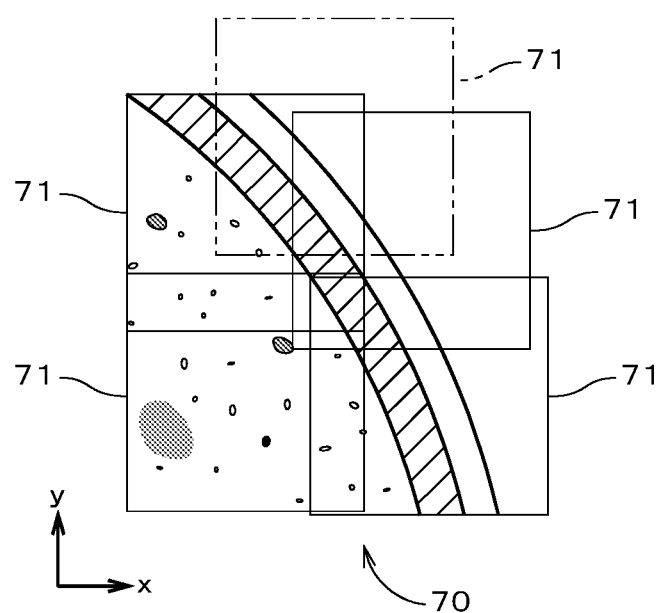
FIG. 9 is a view showing a combined image.

The combined image generation part 43 combines the plurality of picked-up images 71 in accordance with the above-described combination positions, to thereby generate a combined image 70 shown in FIG. 9 (Step S17). Herein, a process of comparative example for determining the combination positions in consideration of the amount of original positional deviation of the specific image pair 72 of the upper-left and upper-right picked-up images 71 in the exemplary case of FIG. 8 will be described. In the process of comparative example, with the effect of the amount of positional deviation indicated by the arrow 79a, the relative position between the upper-left and upper-right picked-up images 71 is largely deviated from the ideal position. With this effect, deviation becomes likely to occur also in the other picked-up images 71. In FIG. 9, the position at which the upper-right picked-up image 71 is to be disposed in the process of comparative example is indicated by a rectangle of two-dot chain line. In contrast to this, in the present exemplary process, by determining the combination positions with the weight of the specific image pair 72 set to be lower, it is possible to suppress the positional deviation caused by the specific image pair 72 in the combined image 70 shown in FIG. 9.

In the image acquisition apparatus 1, an evaluation value indicating the strength of directivity of the similarity map 74 of each specific image pair 72 may be acquired and used for the determination of the combination positions. In an example, when the map angle is acquired in Step S15 (or when the determination process is performed in Step S14), the above-described evaluation value is calculated.

As described earlier, in the case where the binary image indicating a region (i.e., the specified region) having high degree of similarity in the similarity map 74 is generated and the map angle is acquired by the Hough transform of the binary image, for example, a count number in the Hough transform is adopted as the evaluation value. In the case where the principal axis of inertia is obtained in the binary image, for example, the spread of the distribution of the pixels (for example, the standard deviation of the coordinates of the pixels) included in the specified region as viewed in a principal axis direction (as projected on a principal axis) is adopted as the evaluation value. In the case where the ellipse approximation of the specified region is performed in the binary image, for example, the ratio of the lengths of the major axis (long axis) and the minor axis (short axis) of the approximated ellipse (the major axis length/the minor axis length) is adopted as the evaluation value. In the case where the two-dimensional Gaussian fitting is performed in the similarity map 74, for example, the ratio of the maximum value and the minimum value of the standard deviations at the plurality of angles or the size of the maximum value itself is adopted as the evaluation value. The above-described evaluation value becomes larger as the directivity of the similarity map 74 becomes stronger, and the evaluation value can be regarded as a score indicating the reliability of the map angle. Further, the above-described evaluation value can be also regarded as a value indicating how low the reliability of the amount of positional deviation in the specific image pair 72 is.

In Step S16, for example, the reciprocal of the evaluation value is set as the weight of the error of the specific image pair 72. Only if the weight of the specific image pair 72 is lower than that of any other image pair 72 and becomes lower as the evaluation value becomes larger, a value other than the reciprocal of the evaluation value may be adopted. After that, the combination positions are determined by the weighted least-squares method. The specific image pair 72 whose amount of positional deviation has lower reliability thereby produces a smaller effect on the determination of the combination positions. Also in the case where any one of other methods such as the error backpropagation method or the like is used in the determination of the combination positions, the weight of the specific image pair 72 may be determined by using the evaluation value so that the effect of the specific image pair 72 on the determination of the combination positions should become smaller.

In the positional deviation amount specifying part 41, there may be a case where the determination process (Step S14) for determining whether or not there is a directivity of the similarity map 74 of each image pair 72 is omitted and the evaluation values are acquired for all the image pairs 72. In this case, in the combination position determination part 42, an image pair 72 whose evaluation value is larger than a threshold value is handled as the specific image pair 72 and excluded in the determination of the combination positions. The threshold value may be a value (fixed value) determined in advance or may be a value obtained from the evaluation values of all the image pairs 72 (for example, a value obtained by adding the standard deviation to an average value of the evaluation values, or the like). Thus, an image pair 72 whose evaluation value is absolutely or relatively large is handled as the specific image pair 72. In the determination of the combination positions, the weight based on the evaluation value may be set for all the image pairs 72, and in this case, an image pair 72 for which a relatively small weight is set is substantially handled as the specific image pair 72.

As described above, in the image acquisition apparatus 1, the plurality of picked-up images 71 are acquired by the picked-up image acquisition part 2, and in the plurality of picked-up images 71, each image pair 72 representing the adjacent divided regions 81 has the overlapping region 73 where images are partially overlapped. In the positional deviation amount specifying part 41, the amount of relative positional deviation in each image pair 72 is specified by generating the similarity map 74 indicating a distribution of the degree of similarity by template matching on the overlapping region 73 of the image pair 72. In the combination position determination part 42, the combination positions of the plurality of picked-up images 71 are determined on the basis of the amounts of positional deviation in the plurality of image pairs 72 included in the plurality of picked-up images 71 while assuming that an image pair 72 whose similarity map 74 has a directivity is the specific image pair 72 and setting the weight of the specific image pair 72 to be lower than those of other image pairs 72. In the combined image generation part 43, the combined image 70 is generated by combining the plurality of picked-up images 71 in accordance with the combination positions. Thus, in the determination of the combination positions, since an effect of the specific image pair 72 whose amount of positional deviation has lower reliability (is abnormal with high possibility) is made smaller, it is possible to stably generate the combined image 70 having beautiful connections by combining the plurality of picked-up images 71 with high accuracy.

Preferably, the positional deviation amount specifying part 41 acquires the evaluation value indicating the strength of directivity of the similarity map 74 of the specific image pair 72, and the combination position determination part 42 determines the weight of the specific image pair 72 by using the evaluation value. The weight of the specific image pair 72 is thereby appropriately determined on the basis of the strength of directivity of the similarity map 74. Specifically, the weight of the specific image pair 72 whose amount of positional deviation has lower reliability can be made lower. As a result, it is possible to determine the combination positions with higher accuracy.

Preferably, the positional deviation amount specifying part 41 performs the determination process for determining whether or not there is a directivity of the similarity map 74 of each image pair 72. It is thereby possible to easily specify the specific image pair 72, and in the determination of the combination positions, it is possible to reliably make the effect of the specific image pair 72 smaller.

In a case where a shape of the container 91 housing the target object 9 is already known, it is possible to predict a picked-up image 71 having an overlapping region 73 on which the edge of the container 91 is reflected, among the plurality of picked-up images 71, and it is possible to predict a direction of a portion of the edge in the overlapping region 73. In other words, the image pair 72 including the overlapping region 73 on which the edge of the container 91 is to be reflected can be determined as a specific image pair candidate in advance, and the direction of the edge in the overlapping region 73 can be set as an expected angle of the directivity of the similarity map 74 in advance. Hereinafter, an exemplary process using the specific image pair candidate and the expected angle of the directivity will be described.

In the present exemplary process, after the positional deviation amount specifying part 41 specifies the amounts of positional deviation in the plurality of image pairs 72 (FIG. 3: Step S13), the determination process for determining whether or not there is a directivity of the similarity map 74 is performed only on the specific image pair candidate (Step S14). At that time, the determination process is performed only on the expected angle and angles in the vicinity of the expected angle. Specifically, in a case where the two-dimensional Gaussian fitting is performed in the determination process, for example, the Gaussian fitting is performed only within an angle range around the expected angle, which is set in advance, (for example, an angle range from 10 to 90 degrees). Then, in a case where the maximum value of the standard deviation at these angles is not smaller than a predetermined value, it is determined that there is a directivity of the similarity map 74. The specific image pair 72 is thereby specified from the specific image pair candidates. In this case, the map angle is an angle at which the maximum value of the standard deviation is obtained (Step S15). In a case where the determination process other than the two-dimensional Gaussian fitting is performed, an angle at which the process is performed may be restricted within the above-described angle range. The determination of the combination positions and the generation of the combined image (Steps S16 to S17) are performed in the same manner as the above.

As described above, in the present exemplary process, among the plurality of image pairs 72, the specific image pair candidate is determined in advance on the basis of the regions on the target object 9. The positional deviation amount specifying part 41 performs the determination process only on the specific image pair candidate. It is thereby possible to specify the specific image pair 72 in a shorter time as compared with the case where the determination process is performed on all the image pairs 72. Further, it is also possible to prevent or suppress the specific image pair 72 from being wrongly specified, in other words, to stably specify the specific image pair 72.

Further, the expected angle of the directivity of the similarity map 74 is set in advance for a predetermined image pair 72 (in the above-described example, the specific image pair candidate) on the basis of the regions on the target object 9, which are indicated by the image pair 72. The positional deviation amount specifying part 41 performs the determination process for the image pair 72 only on the expected angle and the angles in the vicinity of the expected angle. It is thereby possible to perform the determination process in a shorter time as compared with the case where the determination process is performed on all the angles. Further, it is also possible to stably specify the specific image pair 72.

The information on the specific image pair candidate may be used in the determination of the combination positions. In this case, the positional deviation amount specifying part 41 specifies the specific image pair 72, for example, by performing the determination process for all the image pairs 72. In the combination position determination part 42, for determining the combination positions, the weight of only the specific image pair(s) 72 included in the specific image pair candidates is made smaller than that of any other image pair 72 (only the specific image pair(s) 72 included in the specific image pair candidates may be excluded). On the other hand, the specific image pair 72 not included in the specific image pair candidates is handled as an ordinary image pair 72 (the image pair 72 which is not the specific image pair 72). In other words, in the determination of the combination positions, the weight thereof is not made smaller. It is thereby possible to prevent or suppress the effect of the image pair 72 whose similarity map 74 has a directivity due to the characteristic feature of the target object 9 itself from being made smaller in the determination of the combination positions and to combine the plurality of picked-up images 71 with high accuracy.

The information on the expected angle may be used in the determination of the combination positions. In the combination position determination part 42, for example, a difference (absolute difference) between the map angle acquired in Step S15 and the expected angle is obtained for each specific image pair 72 on which the expected angle is set (i.e., the specific image pair 72 included in the specific image pair candidates). Then, the specific image pair 72 whose difference is not larger than a predetermined value is excluded in the determination of the combination positions. On the other hand, the specific image pair 72 whose difference is larger than the predetermined value is handled as an ordinary image pair 72 and used for the determination of the combination positions. The specific image pair 72 for which no expected angle is set may be similarly handled as an ordinary image pair 72. Further, when the combination positions are determined by the weighted least-squares method or the like, on each specific image pair 72 for which the expected angle is set, the weight of the specific image pair 72 is made smaller as the difference between the map angle and the expected angle is smaller. The specific image pair 72 for which no expected angle is set may be handled as an ordinary image pair 72.

As described above, in the present exemplary process, for a predetermined image pair 72 (in the above-described example, the specific image pair candidate), the expected angle of the directivity of the similarity map 74 is set in advance on the basis of the regions on the target object 9, which are indicated by the image pair 72. The combination position determination part 42 determines the weight of the image pair 72 on the basis of the difference between the map angle and the expected angle. It thereby becomes possible to acquire the combination positions with high accuracy by making the effect (weight) of the image pair 72 whose amount of positional deviation is abnormal with high possibility smaller and appropriately reflecting the effect of the image pair 72 whose amount of positional deviation is abnormal with low possibility.

In the image acquisition apparatus 1 and the image acquisition method described above, various modifications can be made.

The shape of the edge of the container 91 in a plan view is not limited to a circle but may be any other shape such as a rectangle or the like. Further, also in a case where a directivity of the similarity map 74 is caused by any effect other than the edge of the container 91, the image acquisition apparatus 1 may be used. The image acquisition apparatus 1 is especially suitable for a case of combining a plurality of picked-up images 71 including a picked-up image 71 in which a member different from the target object 9 is caught.

The target object 9 is not limited to cells but may be any one of various substrates, mechanical components, or the like. The target object 9 do not necessarily need to be housed in a container. A region of the target object 9 for which a plurality of picked-up images 71 are acquired, in other words, a region in which a plurality of divided regions 81 are set, may be a region indicating part of the target object 9.

The configurations in the above-described preferred embodiment and variations may be combined as appropriate only if those do not conflict with one another.

While the invention has been shown and described in detail, the foregoing description is in all aspects illustrative and not restrictive. It is therefore understood that numerous modifications and variations can be devised without departing from the scope of the invention.

REFERENCE SIGNS LIST

1 Image acquisition apparatus
2 Picked-up image acquisition part
9 Target object
41 Positional deviation amount specifying part
42 Combination position determination part
43 Combined image generation part
70 Combined image
71 Picked-up image
72 Image pair
73 Overlapping region
74 Similarity map
81 Divided region
S11 to S17 Step

The invention claimed is:

1. An image acquisition apparatus for acquiring an image of a target object, comprising:
a picked-up image acquisition part for acquiring a plurality of picked-up images representing a plurality of divided regions, respectively, which are obtained by dividing a predetermined region on a target object, each image pair in said plurality of picked-up images representing adjacent divided regions and having an overlapping region where images are partially overlapped;
a positional deviation amount specifying part for specifying an amount of relative positional deviation in said each image pair by generating a similarity map indicating a distribution of degree of similarity by template matching on said overlapping region of said each image pair;
a combination position determination part for determining combination positions of said plurality of picked-up images on the basis of amounts of positional deviation in a plurality of image pairs included in said plurality of picked-up images while assuming that an image pair whose similarity map has a directivity is a specific image pair and setting a weight of amount of positional deviation in said specific image pair to be lower than those of other image pairs; and
a combined image generation part for generating a combined image by combining said plurality of picked-up images in accordance with said combination positions, wherein
said positional deviation amount specifying part performs a determination process for determining whether or not there is a directivity of said similarity map of said each image pair,
an expected angle of directivity of said similarity map is set in advance for a predetermined image pair on the basis of regions on said target object, which are represented by said image pair, and
said positional deviation amount specifying part performs said determination process for said image pair only on said expected angle and angles in a vicinity of said expected angle.

2. The image acquisition apparatus according to claim 1, wherein
said positional deviation amount specifying part acquires an evaluation value indicating a strength of directivity of said similarity map of said specific image pair, and said combination position determination part determines said weight of said specific image pair by using said evaluation value.

3. The image acquisition apparatus according to claim 1, wherein
said positional deviation amount specifying part acquires a map angle indicating a direction of directivity of said similarity map of said specific image pair.

4. An image acquisition apparatus for acquiring an image of a target object, comprising:
a picked-up image acquisition part for acquiring a plurality of picked-up images representing a plurality of divided regions, respectively, which are obtained by dividing a predetermined region on a target object, each image pair in said plurality of picked-up images representing adjacent divided regions and having an overlapping region where images are partially overlapped;
a positional deviation amount specifying part for specifying an amount of relative positional deviation in said each image pair by generating a similarity map indicating a distribution of degree of similarity by template matching on said overlapping region of said each image pair;
a combination position determination part for determining combination positions of said plurality of picked-up images on the basis of amounts of positional deviation in a plurality of image pairs included in said plurality of picked-up images while assuming that an image pair whose similarity map has a directivity is a specific image pair and setting a weight of amount of positional deviation in said specific image pair to be lower than those of other image pairs; and
a combined image generation part for generating a combined image by combining said plurality of picked-up images in accordance with said combination positions, wherein
said positional deviation amount specifying part performs a determination process for determining whether or not there is a directivity of said similarity map of said each image pair,
a specific image pair candidate is determined in advance on the basis of regions on said target object, among said plurality of image pairs, and
said positional deviation amount specifying part performs said determination process only for said specific image pair candidate.

5. An image acquisition apparatus for acquiring an image of a target object,
a picked-up image acquisition part for acquiring a plurality of picked-up images representing a plurality of divided regions, respectively, which are obtained by dividing a predetermined region on a target object, each image pair in said plurality of picked-up images representing adjacent divided regions and having an overlapping region where images are partially overlapped;
a positional deviation amount specifying part for specifying an amount of relative positional deviation in said each image pair by generating a similarity map indicating a distribution of degree of similarity by template matching on said overlapping region of said each image pair;
a combination position determination part for determining combination positions of said plurality of picked-up images on the basis of amounts of positional deviation in a plurality of image pairs included in said plurality of picked-up images while assuming that an image pair whose similarity map has a directivity is a specific image pair and setting a weight of amount of positional deviation in said specific image pair to be lower than those of other image pairs; and a combined image generation part for generating a combined image by combining said plurality of picked-up images in accordance with said combination positions, wherein said positional deviation amount specifying part acquires a map angle indicating a direction of directivity of said similarity map of said specific image pair, wherein an expected angle of directivity of said similarity map is set in advance for a predetermined image pair on the basis of regions on said target object, which are represented by said image pair, and said combination position determination part determines a weight of said image pair on the basis of a difference between said map angle and said expected angle.

* * * * *